United States Patent [19] [11] Patent Number: 4,609,950
Chiba et al. [45] Date of Patent: Sep. 2, 1986

[54] MAGNETIC HEAD APPARATUS WITH VARIABLE INDUCTANCE

[75] Inventors: Shū Chiba; Norikazu Sawazaki, both of Yokohama, Japan

[73] Assignee: Tokyo Shibaura Denki Kabushiki Kaisha, Kawasaki, Japan

[21] Appl. No.: 477,858

[22] Filed: Mar. 22, 1983

[30] Foreign Application Priority Data

Mar. 29, 1982 [JP] Japan ................................. 57-48853

[51] Int. Cl.[4] .................... G11B 5/02; G11B 5/127; G11B 20/06
[52] U.S. Cl. .................................... 360/29; 360/110; 360/111; 360/55; 369/129
[58] Field of Search ............... 360/110, 111, 119, 29, 360/123, 55; 369/129

[56] References Cited

U.S. PATENT DOCUMENTS

| | | | |
|---|---|---|---|
| 2,918,534 | 12/1959 | Wiegand | 360/123 |
| 2,952,503 | 9/1980 | Becker | 360/35 |
| 3,293,636 | 12/1966 | Dunne | |
| 3,387,100 | 6/1968 | Chipman et al. | 360/55 |
| 3,394,234 | 7/1968 | Grace | 360/66 |
| 3,487,388 | 12/1969 | Camp | 360/111 |
| 3,562,638 | 2/1971 | Renard | |
| 3,585,312 | 6/1971 | Helzer | 360/66 |
| 3,629,520 | 12/1971 | Schwee | 360/111 |
| 3,633,188 | 1/1972 | Bittman | 300/111 |
| 3,651,281 | 3/1972 | Becker | 360/59 |
| 3,683,126 | 8/1972 | Krause | 360/126 |
| 3,693,072 | 9/1972 | Irons et al. | |
| 3,848,217 | 11/1974 | Lazzari | 360/111 X |
| 4,120,011 | 10/1978 | Kolb | 360/111 |
| 4,182,987 | 1/1980 | Moeller | 360/111 |
| 4,358,806 | 9/1982 | Arai | 360/119 |

FOREIGN PATENT DOCUMENTS

| | | |
|---|---|---|
| 1474404 | 7/1969 | Fed. Rep. of Germany . |
| 0045966 | 2/1982 | Fed. Rep. of Germany . |
| 57-36407 | 2/1982 | Japan . |
| 1159987 | 7/1969 | United Kingdom . |
| 2035659 | 6/1980 | United Kingdom . |

OTHER PUBLICATIONS

1964, Int'l. Conf. on Nonlinear Magnetics, Wash., Apr. 1964, pp. 3-4-1 to 3-4-7, IEEE, New York, P. Smaller: "A Flux Sensitive Reproduce Head of Thin Film Construction".
IBM Technical Disclosure Bulletin, vol. 18, No. 10, Mar. 1976, p. 3415, D. L. Horne, Skin Effect Magnetoresistive Devices.
IBM Technical Disclosure Bulletin, vol. 23, No. 10, Mar. 1981, p. 4694, K. B. Klaassen, Biased Magnetic Read Head.

Primary Examiner—Raymond F. Cardillo
Assistant Examiner—Alyssa H. Bowler
Attorney, Agent, or Firm—Oblon, Fisher, Spivak, McClelland & Maier

[57] ABSTRACT

A magnetic recording head apparatus includes: a magnetic head body opposing a travelling magnetic tape; a tuning circuit having the head body as a variable inductance element; a high-frequency signal source for generating a high-frequency signal; and a detector connected to the tuning circuit. The inductance of the head body is changed in accordance with a change in the magnetic signal field applied from the magnetic tape. The high-frequency signal is amplitude-modulated in accordance with the high-frequency signal. A peak or envelope waveform of the modulated high-frequency signal is detected by a detector, thereby obtaining a reproduced information signal.

14 Claims, 16 Drawing Figures

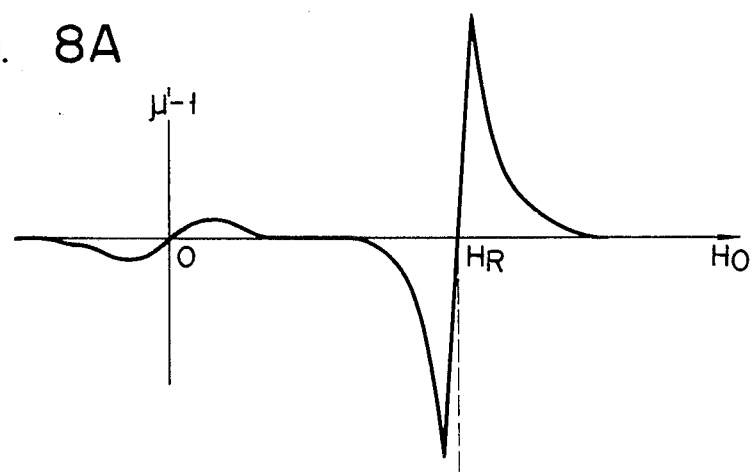
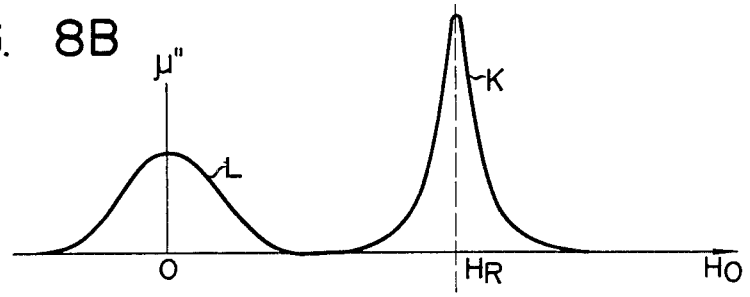
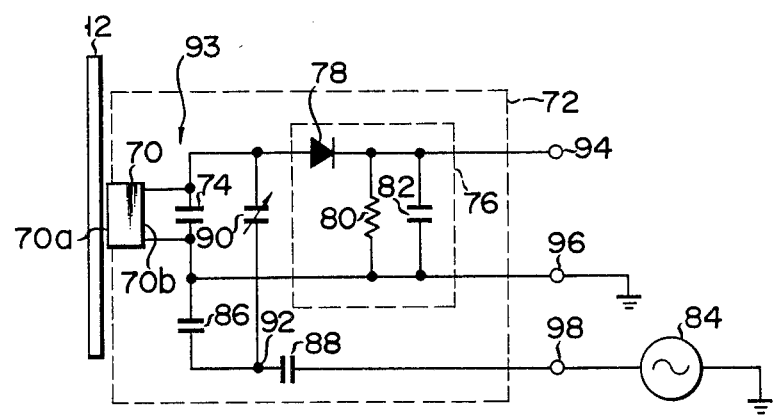

F I G. 10A
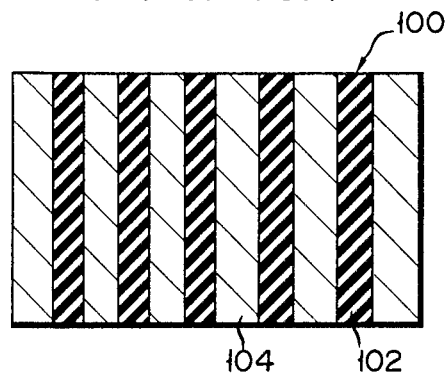
F I G. 10B
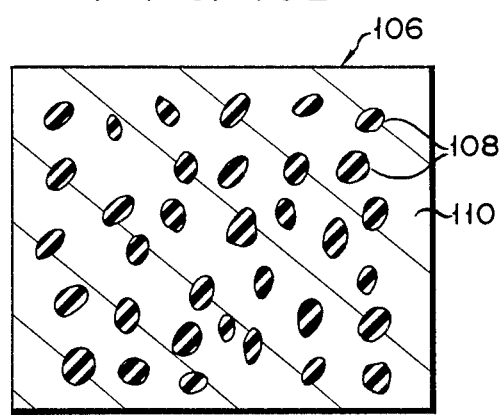

MAGNETIC HEAD APPARATUS WITH VARIABLE INDUCTANCE

BACKGROUND OF THE INVENTION

1. Field of the Invention

The present invention relates to a magnetic reproducing system and, more particularly, to a magnetic head apparatus having a magnetic head for reading out an information signal recorded on a magnetic recording medium such as magnetic tape.

2. Discussion of the Background Art

A reproducing head has been conventionally used to detect and read out the information signal recorded on a magnetic recording medium such as magnetic tape. This reproducing head comprises a ring-shaped iron core which has a gap therein, and a coil which is wound therearound. The recorded magnetic tape travels at the same speed as the recording speed while in contact with the gap of the reproducing head. Since a magnetic field corresponding to the information signal is generated on the tape surface, a magnetic flux flows through the iron core of the head. Therefore, the coil wound around the iron core, which is subjected to electromagnetic induction, serves to generate an electromotive force in proportion to the magnetic flux density on the tape surface.

When the magnetic head apparatus having the structure of this type is applied to a high-density recording-/reproducing system, the required S/N ratio for signal reproduction cannot be obtained. More particularly, in the conventional reproducing system described above, the width of the recording track on the tape must be inevitably decreased to perform high-density recording-/reproduction. As a result, the S/N ratio of the reproduced signal is degraded. According to the conventional magnetic reproducing apparatus, a recorded signal cannot be properly reproduced from a recording track which is narrower than a predetermined width. Therefore, the application of the conventional magnetic head to high-density recording/reproducing systems is limited, resulting in inconvenience.

SUMMARY OF THE INVENTION

It is an object of the present invention to provide a new and improved magnetic head apparatus which may be suitably adapted to a high-density magnetic recording medium.

It is another object of the present invention to provide a new and improved magnetic head apparatus which can detect a magnetic field corresponding to information recorded on a magnetic recording medium with high sensitivity, and which may thus be suitably adapted to a high-density recording/reproducing system.

A magnetic reproducing head apparatus according to the present invention has a magnetic head body for detecting a change in a magnetic field produced by a magnetic recording medium which prestores information. The magnetic head body changes its inductance in accordance with a change in the magnetic field. The inductance is changed in accordance with a change in permeability $\mu$ of the magnetic head body and/or a change in the high-frequency loss thereof. The inductance of the magnetic head body can also be changed using a resonant absorption effect, to be described later. An externally supplied high-frequency signal is amplitude-modulated in accordance with the change in inductance of the magnetic head body. The modulated signal is then supplied to a detector (demodulator). This detector detects a peak or envelope waveform of the modulated signal and produces an output signal corresponding to the information as previously mentioned.

Therefore, the magnetic reproducing head apparatus includes a tuning circuit in which a magnetic head body alone serves as a variable inductance element. The tuning circuit has a capacitor which is directly connected to the magnetic head body, to a high-frequency signal source for generating the high-frequency signal, and to the detector.

According to the present invention, even if a magnetic signal field formed by the magnetic recording medium is low, the externally supplied high-frequency signal can be efficiently amplitude-modulated in accordance with the change in inductance, thereby providing a magnetic reproducing head apparatus which is suitable for high-density recording/reproducing systems.

BRIEF DESCRIPTION OF THE DRAWINGS

The present invention is best understood by reference to the accompanying drawings, in which:

FIGS. 8A and 8B are graphs respectively showing the relation of the tensor permeability of the magnetic material of the magnetic head and the microwave loss to the magnitude of the magnetic field;

FIG. 9 is a circuit diagram showing the overall arrangement of a magnetic reproducing head apparatus according to another embodiment of the present invention; and FIGS. 10A and 10B are sectional views respectively showing modifications of the magnetic body.

DETAILED DESCRIPTION OF THE PREFERRED EMBODIMENTS

A prior art reproducing head apparatus will be described before embodiments of the present invention are described, for better understanding of the present invention.

Figure 1:
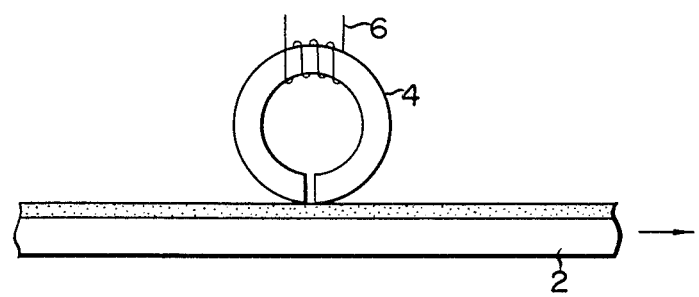
FIG. 1 is a schematic view showing a prior art magnetic reproducing head apparatus.
Figure 2:
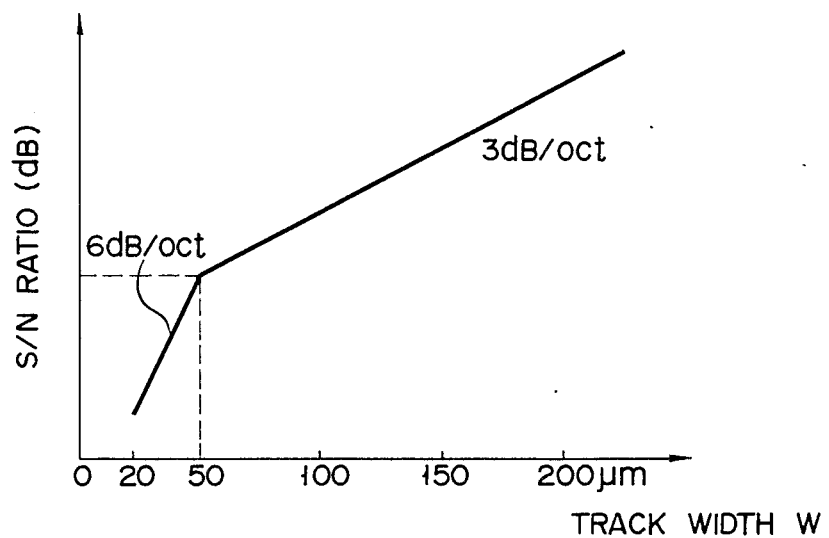
FIG. 2 is a graph showing the relation between the signal-to-noise ratio (S/N ratio) of a reproduced information signal and a track width of a magnetic tape in the prior art magnetic head apparatus of FIG. 1.

In a conventional reproducing system for reproducing the signal recorded on a magnetic recording medium, a magnetic recording medium such as a magnetic tape 2 on which signals are recorded, travels relative to a ring-shaped reproducing head 4, as shown in FIG. 1. An electromotive force induced by the reproducing head 4, in accordance with the same principle as an electromagnetic motor, is produced to obtain a reproduced signal. According to this system, however, a sufficiently large magnetic flux is required to obtain a sufficiently large reproduced signal with a high S/N ratio, resulting in a great width W of the recording track of the magnetic tape 2. FIG. 2 shows the relationship between the S/N ratio of the reproduced signal and the track width W. As is apparent from FIG. 2, when the track width W is as great as 200 μm, the S/N ratio of the reproduced signal is sufficiently high. However, as the track width decreases, the S/N ratio also decreases at a steady rate corresponding to a parameter level of 3 dB/oct. Furthermore, when the track width W is made narrower than a track width W1 at which a reproducing amplifier noise $N_O$ becomes equal to a tape noise $N_T$, the reproducing amplifier noise $N_O$ becomes greater than the tape noise $N_T$. Therefore, the S/N ratio decreases at a faster rate corresponding to 6 dB/oct, when the track width W is made narrower than the specific track width W1. The above relation is given by equation (1) as follows:

$$\frac{S}{N} = \frac{S}{\sqrt{N_O^2 + N_T^2}} \quad (1)$$

As is apparent from FIG. 2, when the track width is made narrower than the track width W1, the S/N ratio abruptly decreases. Such a decrease in S/N ratio cannot be greatly improved even if the number of turns of the coil 6 of the reproducing head 4 is increased. This is because the reproducing amplifier noise $N_O$ is associated with the impedance of the reproducing head 4, and since the impedance thereof increases when the number of turns of the coil 6 of the head 4 increases, the reproducing amplifier noise $N_O$ also increases therewith. Therefore, especially when a long recording/reproduction period is required in a video tape recorder (VTR) or a magnetic disc, and a small track width is required for this purpose, the S/N ratio is as small as about 43 dB when the track width W is about 20 μm. As a result, according to the conventional magnetic recording/reproducing system, a decrease in the track width must be foregone in favor of a high S/N ratio, thus limiting high-density recording/reproduction.

Figure 3:
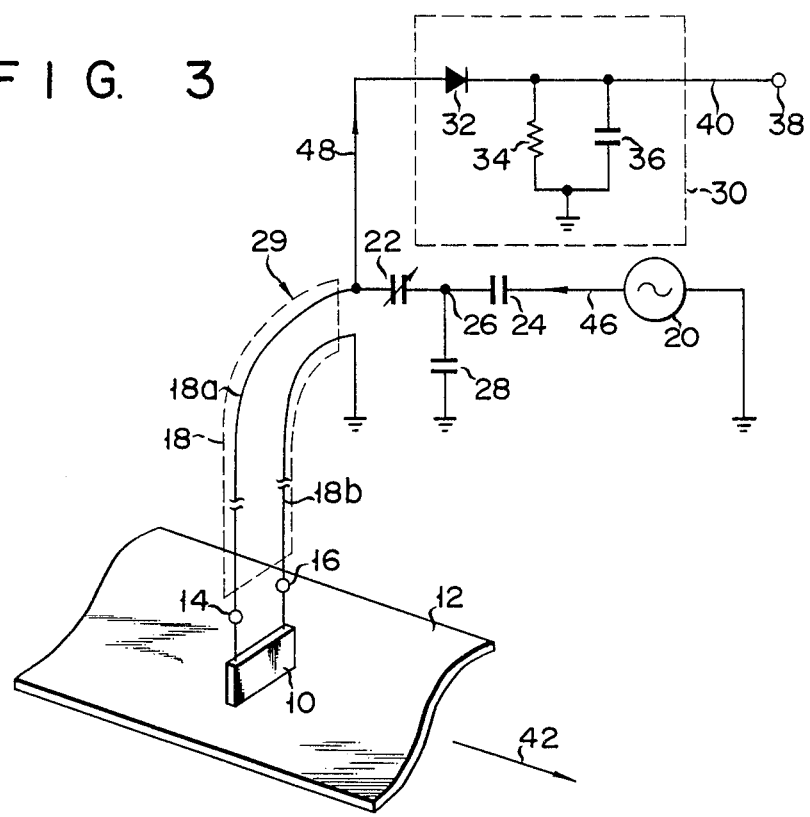
FIG. 3 is a view showing the arrangement of a magnetic reproducing head apparatus according to an embodiment of the present invention.

Referring now to FIG. 3, a magnetic reproducing head apparatus applied to a high-density recording/reproducing system is illustrated according to an embodiment of the present invention. A recorded surface of a magnetic tape 12 which is in linear motion slides past a magnetic reproducing head body 10 comprising a plate-shaped magnetic body. The two ends of the head body 10 are respectively connected to terminals 14 and 16. A central conductor or a core wire 18a of a coaxial cable 18 and a net-like shield wire 18b, which is grounded, are electrically and directly connected to the terminals 14 and 16, respectively. The core wire 18a of the coaxial cable 18 is connected to one end of a high-frequency oscillator 20 through a variable capacitor or trimmer capacitor 22 and a matching capacitor 24.

The other end of the high-frequency oscillator 20 is grounded. A common node 26 between the trimmer capacitor 22 and the matching capacitor 24 is grounded through a matching capacitor 28. In this embodiment, the magnetic reproducing head 10, the coaxial cable 18 and the trimmer capacitor 22 constitute a tuning circuit 29.

The core cable 18a of the coaxial cable 18 is further connected to a detector (demodulator) 30. The detector 30 includes a diode 32, a resistor 34 and a capacitor 36. The cathode of the diode 32 is connected to a signal output terminal 38 via a signal line 40. A parallel circuit of the resistor 34 and the capacitor 36 is connected between the signal line 40 and ground.

The reproducing head body 10 is made of a magnetic body, such as a thin-film of Permalloy, Alperm, or an amorphous cobalt-based alloy, which has a considerably high permeability μ with respect to a change in the intensity of an external magnetic field (i.e., the intensity of the magnetic signal field generated from the magnetic tape).

Figure 4:
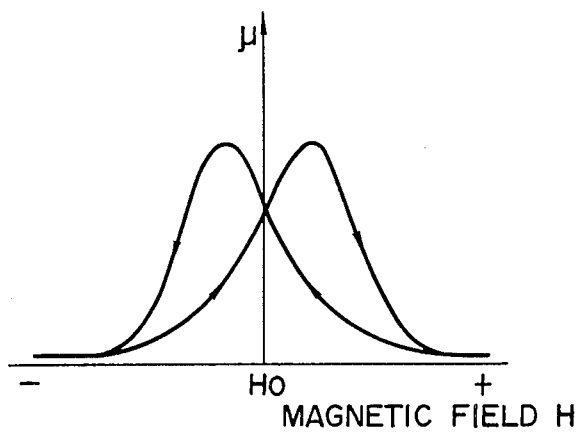
FIG. 4 is a graph showing a change in permeability ($\mu$) of a magnetic head body of the reproducing head apparatus of FIG. 3.

In the magnetic head apparatus having the structure as described above, the magnetic tape 12 travels linearly in the direction indicated by an arrow 42. It is noted that information signals are magnetically recorded on the magnetic tape 12 in accordance with a known magnetic recording method. The record surface of the magnetic tape 12 slides past the head body 10. A magnetic signal field H which varies in accordance with the recorded information signal of the magnetic tape 12 is applied to the head body 10. The permeability μ of the magnetic material which constitutes the head body 10 changes as shown in FIG. 4 in accordance with a change in the magnetic signal field H. Assume that the magnetic material of the head body 10 is used in a frequency range (low-frequency range) in which high-frequency signal loss does not occur. The inductance of the head body 10 is greatly changed substantially in proportion to the change in permeability μ. Therefore, the tuning frequency of the tuning circuit 29, comprising the head body 10, the coaxial cable 18 and the trimmer capacitor 22, changes.

Figure 5A:
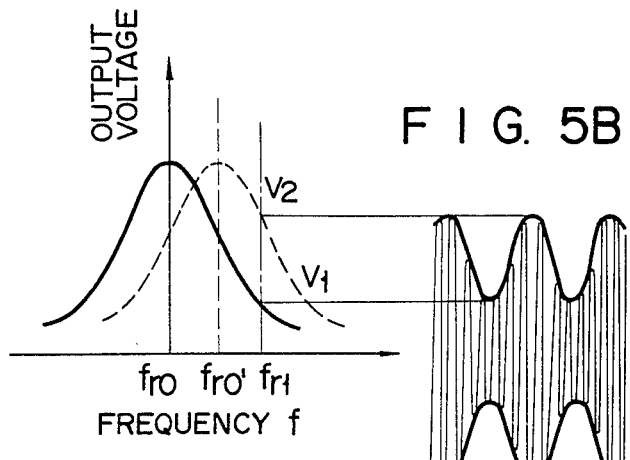
FIG. 5A is a graph showing a change in the output voltage of a tuning circuit in accordance with a change in the tuning frequency.
Figure 5B:
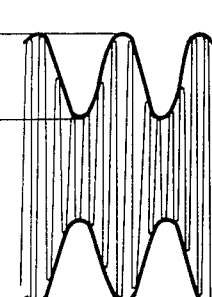
FIG. 5B is a graph showing the waveform of an oscillator output signal amplitude as a result of a change in tuning frequency due to a change in the magnetic signal field.
Figure 5C:
FIG. 5C is a waveform diagram showing an output obtained as a result of detection of the peak or envelope waveform of the modulated high frequency signal shown in FIG. 5B.

If the initial tuning center frequency of the tuning circuit 29 is set to be $fr_0$, which is indicated by a solid line in the graph (FIG. 5A) of the output voltage versus frequency characteristics, the tuning center frequency of the tuning circuit 29 is changed to be $fr_0'$, indicated by a dotted line in the graph in FIG. 5A. When the frequency of a high-frequency signal 46 (FIG. 3) supplied from the high-frequency oscillator 20 (FIG. 1) to the tuning circuit 29 is set to be $fr_1$ (indicated by a dash-dot line in FIG. 5A for illustrative convenience) higher than the frequency $fr_0'$, a voltage appearing across two output ends of the tuning circuit 29 changes from $V_1$ to $V_2$, as shown in FIG. 5A. Therefore, the high-frequency signal 46 supplied from the high-frequency oscillator 20 to the tuning circuit 29 is amplitude-modulated according to the recorded signal of the magnetic tape 12, as illustrated in a simplified typical example in FIG. 5B, thereby producing a modulated signal 48 (a detection signal of information magnetically recorded on the magnetic tape 12). The modulated signal 48 is then supplied to the detector 30. The detector 30 detects the peak (i.e., envelope waveform) of the modulated signal 48. As a result, a reproduced signal is obtained which has a waveform shown in FIG. 5C.

Unlike the prior art magnetic head apparatus using the ring-shaped magnetic reproducing head 4 shown in FIG. 1, the high-frequency signal 46 is amplitude-modulated in accordance with changes in the magnitude and direction of the magnetic field according to the present invention. This magnetic field indicates recorded information and is applied from the magnetic recording medium such as the magnetic tape 12 to the specific magnetic body which constitutes the head body 10. As a result, the information can be reproduced. In the reproducing mode, the reproducing output energy can be obtained from a separate energy source such as the high-frequency oscillator 20. Even if only a small change occurs in the magnetic field generated from the magnetic tape 12, the degree of amplitude modulation of the high-frequency signal can be increased. Therefore, the information signal magnetically recorded on the tape 12 can be picked up with high sensitivity. Along with this improvement, the number of information recording tracks which may be formed on the magnetic tape 12 can be increased, thereby achieving higher-density recording. Furthermore, even if each track width is very small, information reproduction can be performed while the S/N ratio of the reproduced signal is kept high. This is because the magnetic head apparatus of this invention performs the information reproduction on the basis of detecting a change in intensity of the magnetic field, unlike the conventional ring-shaped head which detects a change in the total amount of the magnetic flux with time.

The head body 10 included in the tuning circuit 29 effectively serves as a variable inductance element per se. For this reason, a coil need not be wound around the head body 10.

In the above embodiment, the change in the magnetic field applied from the magnetic tape 12 to the head body 10 is detected by utilizing a change in the tuning center frequency $f_{r0}$ in accordance with a change in permeability $\mu$ of the head body 10 of the magnetic head apparatus. The information signal recorded on the magnetic tape 12 is then picked up in accordance with a detection signal. However, the present invention is not limited to the above system. For example, the information signal may be picked up from the magnetic tape 12 in accordance with a change in tuning sharpness Q caused by a change in high-frequency loss of the head body 10 (caused by a change in the magnetic field), using a similar arrangement as the magnetic head apparatus shown in FIG. 1.

Figure 6A:
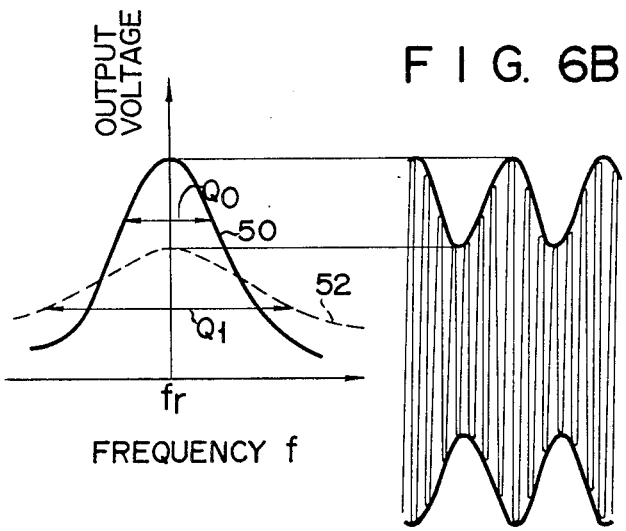
FIG. 6A is a graph showing a change in the output voltage of the tuning circuit with a change in the tuning sharpness Q of the tuning circuit.

According to this technique, the tuning frequency of the tuning circuit 29 and the frequency of the high-frequency signal 46 from the high-frequency oscillator 20 are set to the same value (i.e., frequency fr), as shown in FIG. 6A. When the magnetic flux of the magnetic signal field H applied from the recorded magnetic tape 12 to the head body 10 is changed, the high-frequency loss is changed in accordance with the state of magnetization of the head body 10, thereby changing the tuning sharpness Q. For example, referring to FIG. 6A, when the tuning characteristic changes from an initial state 50 indicated by the solid curve to a state 52 indicated by a dotted curve, the tuning sharpness Q is changed from $Q_0$ to $Q_1$. When the head body 10 comprises a magnetic material, such as a thin-film of Permalloy, Alperm, or an amorphous cobalt-based alloy, whose high-frequency loss from changes in the magnetic field is great, and which is used in a predetermined frequency range, the tuning sharpness Q is greatly changed.

Figure 6B:
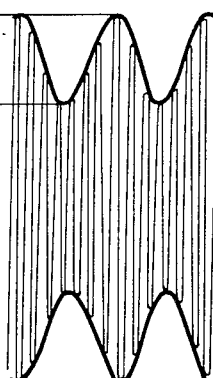
FIG. 6B is a graph showing the waveform of an oscillator output signal amplitude modulated as a result of a change in the tuning sharpness Q of the tuning circuit due to a change in the magnetic signal field generated from a magnetic tape shown in FIG. 3.
Figure 6C:
FIG. 6C is a waveform diagram showing an output obtained as a result of the detection of the peak or envelope waveform of the modulated high frequency signal shown in FIG. 6B.

When the tuning sharpness Q of the tuning circuit 29 constituted by the head body 10, the coaxial cable 18 and the capacitor 22 is changed in a manner as illustrated in FIG. 6A, the output voltage level of the tuning circuit 29 changes. The high-frequency signal 46 from the high-frequency oscillator 20 is amplitude-modulated, as shown in FIG. 6B. This modulated signal is then envelope-detected by the detector 30, thereby obtaining the reproduced information output as shown in FIG. 6C.

Figure 7:
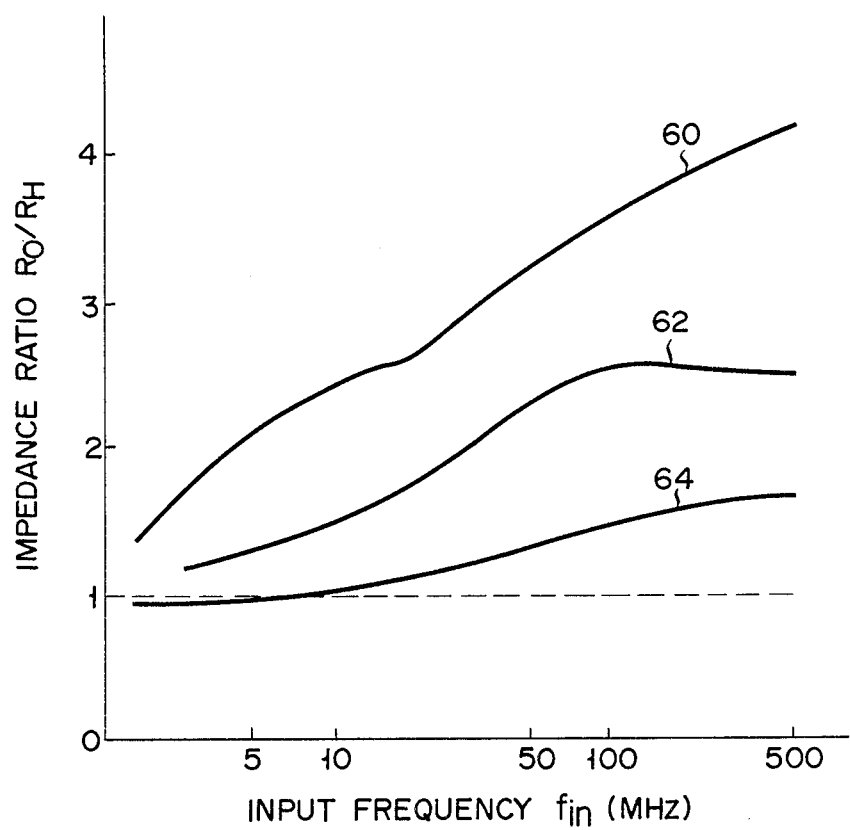
FIG. 7 is a graph showing a change in impedance ratio with respect to a change in frequency of a high-frequency signal current flowing in the conductive magnetic body.

FIG. 7 is a graph of experimental characteristics obtained by plotting a ratio $R_O/R_H$ as a function of input frequency $f_{in}$, where $R_H$ is the real part of an impedance obtained when a high-frequency current flows in the conductive magnetic body or head body and an external magnetic field is applied to saturation, and $R_O$ is the real part of an impedance obtained when the magnetic field is applied to the conductive magnetic body but not to saturation. The conductive magnetic body used had a size of $1 \times 1 \times 0.01$ mm$^3$. As is apparent from the graph in FIG. 7, when the conductive magnetic body (head body) comprises an amorphous cobalt-based alloy, the impedance ratio $R_O/R_H$ is about 4 when the input frequency $f_{in}$ is 500 MHz, as indicated by a curve 60; thus the impedance ratio $R_O/R_H$ is greatly changed. Curves 62 and 64 of the graph in FIG. 7 denote changes when the magnetic bodies (head bodies) comprise an amorphous ferrous material and Permalloy, respectively. When Permalloy is used, the impedance ratio $R_O/R_H$ is about 1.5 when the input frequency $f_{in}$ is 500 MHz. It is assumed that the impedance ratio becomes about 0.95 (less than 1) when the input frequency $f_{in}$ is 7 to 8 MHz, due to DC magnetoresistance. According to the experimental results illustrated in FIG. 7, it was found that information reproduction according to the magnetic field change detection technique of the present invention is essentially different from a conventional magnetic change detection technique for reproducing information based on the change in magnetic field of so-called DC resistance. According to the present invention, a change in the apparent resistance (imaginary part) of the impedance is utilized. This change is caused by a high-frequency loss of the head body receiving a high-frequency current. By the change in apparent resistance, the magnetic signal field from the recorded magnetic tape is detected, thereby picking up or reading out the stored information. Therefore, the magnetic detection sensitivity is very high.

Either one of the above-mentioned reproducing methods (i.e., the first method for utilizing a change in tuning frequency which is caused by a change in permeability $\mu$ of the head body of the reproducing head, and the second method for utilizing a change in tuning sharpness of the tuning circuit which is caused by the high-frequency loss of the head body) may be utilized. However, the change in tuning sharpness Q and the change in tuning frequency of the tuning circuit occur simultaneously in a low magnetic field, so that these two reproducing methods may be simultaneously used.

In the magnetic field detection techniques described above, changes in permeability μ and/or tuning sharpness Q are utilized. The change in permeability occurs only in a low magnetic field, and the change in tuning sharpness Q caused by high-frequency loss also occurs in a low magnetic field. When the permeability μ is expressed in a complex form $\mu = \mu' - j\mu''$ (where j is the imaginary number $j^2 = -1$), a change in the magnitude of the imaginary part $\mu''$ corresponds to a change in high-frequency loss.

According to the present invention, utilizing a phenomenon of resonant absorption of microwaves in a high magnetic field, the magnetic field corresponding to information recorded on the magnetic tape can be detected.

FIGS. 8A and 8B show changes in the real part (i.e., tensor permeability) $\mu'$ of the permeability μ ($= \mu' - j\mu''$) and in the magnitude of the imaginary part $\mu''$ (loss term), in accordance with the externally applied magnetic field. The external magnetic field $H_O$ is plotted along the axis of abscissa in each of FIGS. 8A and 8B. The forward bias direction of the external magnetic field is selected as a direction wherein the direction of precession of the magnetization vector of the magnetic body and the rotational frequency thereof coincide with the circularly polarized wave of the high-frequency signal and the rotational frequency thereof. As is apparent from FIGS. 8A and 8B, a magnetic body generally has a characteristic curve L which indicates changes in tensor permeability $\mu'$ and the loss term $\mu''$ in a low magnetic field. The magnetic body also has a characteristic curve K which indicates changes in tensor permeability $\mu'$ and the loss term $\mu''$ in a high magnetic field in accordance with the phenomenon of resonant absorption of microwaves only in a high magnetic field. Therefore, the information can be read out from the magnetic recording medium such as the magnetic tape 12 (FIG. 3) in the same manner as described above by using the phenomenon of resonant absorption of microwaves. In this case, a predetermined biasing magnetic field having a predetermined intensity must be applied to the head body in a manner described below. A DC or AC magnetic field can be applied by a permanent magnet or an electromagnet as needed. In this case, if the frequency of the high-frequency magnetic field is given as $f_h$ applied in the X-Y plane perpendicular to a resonant magnetic field $H_R$ (Z-axis), the frequency $f_h$ has the following relation with the resonant magnetic field $H_R$:

$$f_h = \gamma \sqrt{\{H_R + (N_X - N_Z)M_S\}\{H_R + (N_Y - N_Z)M_S\}} \quad (2)$$

where
γ: gyromagnetic ratio which is generally 2.8 MHz/Oe
$N_X$, $N_Y$ and $N_Z$: coefficients of the demagnetizing field when the resonant magnetic field (external magnetic field) is applied along the Z-axis, wherein $N_X + N_Y + N_Z = 4\pi$
$M_S$: saturation magnetic field
When the external magnetic field is applied along the axis ($N_X = 4\pi$, $N_Y = 0$ and $N_Z = 0$) of a plane-like magnetic body, equation (2) may be rewritten as follows:

$$f_h = \gamma \sqrt{H_R(H_R + 4\pi M_S)} \quad (3)$$

If a proper saturation magnetization and proper frequency are selected, the bias magnetic field is made smaller than the coercive force of the magnetic field of 300 to 500 Oe and can easily keep the recorded information unchanged. If the frequency $f_h$ is 800 MHz, saturation magnetization can be achieved when a magnetic material of 8,000 gauss (e.g., Permalloy) and of a plane shape is used to apply a magnetic field so as to have a strength of about 10 Oe. When the biasing magnetic field is set to have a strength close to 10 Oe, the change in tensor permeability or loss which is caused by the resonance absorption phenomenon can be easily obtained. However, when the biasing magnetic field (including a nonbiasing magnetic field) does not have a strength of 10 Oe and has a coercive force lower than that in the saturated state, the change in loss in the low magnetic field can be easily obtained.

Referring to FIG. 9, a magnetic reproducing head apparatus is illustrated according to a second embodiment of the present invention. A magnetic body (head body) 70 which comprises the same material as that of the head body 10 of FIG. 1 is housed in a head housing 72, such that one surface 70a of the magnetic body 70 opposes a magnetic tape 12 which travels therealong so as to effectively detect a magnetic field from the magnetic tape 12. The other surface 70b as an inductance element of the magnetic body 70 is electrically connected to a capacitor 74 which has a capacitance tuned with the inductance of the magnetic body 70. A peak detector (demodulator) 76 is connected to the two ends of the capacitor 74. The detector 76 comprises a diode 78, the anode of which is connected to one end of the capacitor 74, a resistor 80 connected to the cathode of the diode 78 and the other end of the capacitor 74, and a capacitor 82 connected in parallel with the resistor 80. The other end of the capacitor 74 is also connected to a high-frequency signal source 84 arranged independent of the head housing 72 through capacitors 86 and 88 for matching the impedance of the high-frequency signal source 84. A fine adjustment variable capacitor (trimmer capacitor) 90 is connected between the one end of the capacitor 74 connected to the magnetic body 70 and a common node 92 of the capacitors 86 and 88. It is noted that a tuning circuit 93 includes the magnetic body 70, the capacitor 74 and the trimmer capacitor 90. Reference numerals 94, 96 and 98 denote a signal output terminal, a ground terminal, and a high-frequency input terminal, respectively. The constituent elements, including the magnetic body 70 and the detector 76 and the like but excluding the high-frequency signal source 84, are mounted on a single circuit board such as a printed circuit board (not shown) in the head housing 72.

According to the second embodiment of the present invention described above, unlike the first embodiment in which the coaxial cable 18 is used as an inductance element of the tuning circuit, the inductance element which changes its inductance in the tuning circuit in accordance with the external magnetic field fundamentally comprises only the magnetic body 70. Therefore, all the main circuit constituents such as the detector 76 and the tuning circuit 93 including the magnetic body 70 which are used for detecting the external magnetic field so as to achieve information reproduction can be arranged as discrete circuit elements. These circuit elements can be mounted on the circuit board (not shown) together with the magnetic body 70 in the head housing 72, so that the head section can be made compact as a whole. Furthermore, a process for manufacturing the head apparatus can be simplified.

According to the magnetic reproducing head apparatuses shown in FIGS. 1 and 9, a coil wiring as an auxiliary inductance element need not be used for the magnetic body (head body) 10 or 70 which functions as an inductance element in the tuning circuit, so that a simple structure can be obtained. As a result, the head body (magnetic body) can be easily multi-layered.

FIG. 10A illustrates a model of a cross section (taken along the plane parallel to the magnetic tape travel direction) of a head body 100 (which can be, of course, applied to the head apparatuses shown in FIGS. 1 and 9) having a multi-layer structure. Magnetic layers 102 comprise a nonconductive (insulating) and magnetic material, such as ferrite, which is used for a high-frequency signal. Electrically conductive layers 104 sandwich the corresponding magnetic layers 102 therebetween. The electrically conductive layers 104 comprise a metal such as gold, silver, copper, platinum, tungsten, molybdenum or the like which has a high conductivity and a good resistance to wear. The number of layers 102 and 104 and the total thickness may be arbitrarily determined by a person skilled in the art by considering the application conditions as the basis of circuit design.

According to a magnetic body 106 having a section shown in FIG. 10B, the magnetic material is pulverized to form magnetic fragments 108. These magnetic fragments 108 are arbitrarily scattered and mixed in an electrically conductive base body 110. The materials for the magnetic fragments 108 and the conductive base body 110 comprise the same magnetic and conductive materials described with reference to FIG. 10A. The head body forming technique described with reference to FIG. 10B is very effective for a combination of magnetic and conductive materials which tend to peel off from each other.

Although the present invention has been shown and described with reference to particular embodiments, various changes and modifications which are obvious to a person skilled in the art to which the invention pertains are deemed to lie within the spirit of the invention.

What we claim is:

1. An apparatus for detecting a magnetic field changing in accordance with information stored on a magnetic recording medium and for producing an electrical information signal corresponding to the magnetic field, said apparatus comprising:

high-frequency signal source means for generating a predetermined high-frequency signal;

plate-shaped magnetic head body means, connected to said high-frequency signal source means to receive the high-frequency signal, for detecting a change in intensity of the magnetic field and for causing change in an inductance thereof, said magnetic body means comprising electrically insulative magnetic material having its inductance changed in accordance with the change in the magnetic field intensity and electrically conductive material for magnetically insulating said magnetic material and for causing the high-frequency signal to flow in said head body means wherein said head body means further includes a head body of a multi-layered structure in which a plurality of first layers made of said electrically insulating magnetic material are formed with one of a plurality of second layers made of said electrically conductive material interposed between each pair of adjacent ones of said first layers;

first circuit means, connected to said head body means and said high-frequency signal source means, for amplitude-modulating the high-frequency signal in response to the change in inductance of said head body means, thereby producing a modulated signal; and second circuit means, connected to said first circuit means, for receiving the modulated signal to detect an envelope waveform of the modulated signal, and for producing the electrical information signal corresponding to the change in intensity of the magnetic field, which is generated in accordance with the information stored on the magnetic recording medium.

2. An apparatus according to claim 1, wherein said insulative magnetic material has its permeability which changes in accordance with the change in intensity of the magnetic field, and wherein said first circuit means includes a tuning circuit for changing a tuning center frequency thereof in accordance with change in permeability of said insulative magnetic material.

3. An apparatus according to claim 2, wherein said tuning circuit includes a capacitor, and electrical conductive means directly connected to said magnetic body means so as to connect said magnetic body means and said capacitor.

4. An apparatus according to claim 3, wherein said electrical conductive means includes a coaxial cable which has a core wire and a shield wire, said core wire being connected between said magnetic body means and said capacitor, and said shield wire being grounded.

5. An apparatus according to claim 3, further comprising supporting means for stably supporting said magnetic body means and said first and second circuit means which are electrically connected.

6. An apparatus for detecting a magnetic field changing in accordance with information stored on a magnetic recording medium and for producing an electrical information signal corresponding to the magnetic field, said apparatus comprising:

high-frequency signal source means for generating a predetermined high-frequency signal;

plate-shaped magnetic head body means, connected to said high-frequency signal source means to receive the high-frequency signal, for detecting a change in intensity of the magnetic field and for causing change in an inductance thereof, said magnetic body means comprising electrically insulative magnetic material having its inductance changed in accordance with the change in the magnetic field intensity and electrically conductive material for magnetically insulating said magnetic material and for causing the high-frequency signal to flow in said head body means wherein said head body means further includes a head body of a structure in which a plurality of magnetic fragments made of said electrically insulating magnetic material are scattered and mixed in a base layer made of said electrically conductive material such that said magnetic fragments are spaced apart from each other;

first circuit means, connected to said head body means and said high-frequency signal source means, for amplitude-modulating the high-frequency signal in response to the change in inductance of said head body means, thereby producing a modulated signal; and second circuit means, connected to said first circuit means, for receiving the modulated signal to detect an envelope waveform of the modulated signal, and for producing the electrical information signal corresponding to the change in intensity of the magnetic field, which is generated in accordance with the information stored on the magnetic recording medium.

7. An apparatus according to claim 6, wherein said insulative magnetic material has its high-frequency magnetic loss which changes in accordance with the change in intensity of the magnetic field, and wherein said first circuit means includes a tuning circuit for changing a tuning sharpness thereof in accordance with change in the high-frequency magnetic loss of said insulative magnetic material.

8. An apparatus according to claim 7, wherein said tuning curcuit includes a capacitor, and electrical conductive means directly connected to said magnetic body means so as to connect said magnetic body means and said capacitor.

9. An apparatus according to claim 8, further comprising supporting means for stably supporting said magnetic body means and said first and second circuit means which are electrically connected.

10. An apparatus according to claim 8, wherein said electrical conductive means includes a coaxial cable which has a core wire and a shield wire, said core wire being connected between said magnetic body means and said capacitor, and said shield wire being grounded.

11. A magnetic head reproducing head apparatus for detecting a magnetic signal field generated in accordance with information stored on a magnetic recording medium and for electrically picking up the information in accordance with the magnetic signal field, comprising:

(a) demodulating means for receiving a high-frequency current signal to detect the magnetic signal field and for amplitude-modulating the high frequency current signal in accordance with the magnetic signal field detected, said demodulating means comprising, plate-shaped magnetic head body means, disposed to oppose the magnetic recording medium, for receiving the magnetic signal field and for changing an inductance thereof in accordance with change in intensity of the magnetic field, said magnetic head body means comprising a composite head body which comprises an insulating magnetic material serving as an inductance element having its inductance changed in accordance with the change in the magnetic field intensity and electrically conductive material for allowing the high-frequency current signal to flow in said head body means, and a capacitor directly connected to said magnetic head body means; and (b) information signal generating means, electrically connected to said demodulating means, for detecting an envelope waveform of the demodulated high-frequency signal and for producing a reproduced information signal having a voltage waveform corresponding to the envelope waveform.

12. An apparatus according to claim 11, wherein said plate-shaped magnetic head body means includes a head body of a multi-layered structure in which a plurality of first layers made of said electrically insulating magnetic material are formed with one of a plurality of second layers made of said electrically conductive material interposed between each pair of adjacent ones of said first layers.

13. An apparatus according to claim 11, wherein said plate-shaped magnetic head body means includes a head body of a structure in which a plurality of magnetic fragments made of said electrically insulating magnetic material are scattered and mixed in a base layer made of said electrically conductive material such that said magnetic fragments are spaced apart from each other.

14. An apparatus according to claim 11, further comprising means for stably storing said demodulating means and said information signal generating means therein.

* * * * *